United States Patent Office 2,870,117
Patented Jan. 20, 1959

2,870,117

COATING COMPOSITION COMPRISING AN EPOXY RESIN AND AN ALDEHYDE-REACTED POLYMER OF ACRYLAMIDE AND METALLIC SURFACE COATED THEREWITH

Henry A. Vogel and Harold G. Bittle, Gibsonia, and Roger M. Christenson, Richland Township, Pa., assignors to Pittsburgh Plate Glass Company No Drawing. Application January 19, 1956
Serial No. 560,073

11 Claims. (Cl. 260—45.5)

This invention relates to resinous coating compositions particularly useful as appliance finishes, and pertains more specifically to coating compositions containing an aldehyde modified acrylamide interpolymer and an epoxy resin.

In a copending application, Serial No. 490,409, filed February 24, 1955, now abandoned, it is disclosed that useful resinous materials are readily obtained by reacting an aldehyde, particularly formaldehyde, with an interpolymer of acrylamide and one or more polymerizable ethylenically unsaturated monomers. The resulting resins range from soft flexible materials to very hard solids, depending upon the choice of monomers utilized in preparing the acrylamide interpolymer which in turn is reacted with the aldehyde. The resins are useful in coating compositions, giving very tough and mar-resistant films which possess excellent chemical resistance.

It has now been discovered that outstanding coating compositions can be obtained by blending the aldehyde modified amide interpolymers with an epoxide resin. The resulting coating compositions form films with excellent flexibility, excellent recoat adhesion and freedom from undesirable color formation, particularly on overbaking of the film. Moreover, these improved properties are obtained without loss of any of the desirable properties possessed by the aldehyde modified acrylamide interpolymers. For example, the coating compositions of this invention form films which are outstanding in appearance, gloss, mar-resistance, color retention, moisture resistance, stain resistance, grease resistance, heat resistance, detergent resistance, corrosion resistance, adhesion and flexibility, and have no undesirable odor. These properties render the compositions of this invention useful as finishes for appliances, such as ranges, refrigerators, air conditioners, washers, water heaters, and, in fact as general industrial finishes on solid surfaces such as metals, plastics, wall board, and the like.

As stated hereinabove, acrylamide or other polymerizable amide is polymerized with one or more ethylenically unsaturated monomeric compounds, and the resulting interpolymer reacted with an aldehyde to form one component of the coating compositions of this invention. The exact mechanism whereby the amide interpolymers are obtained is not definitely known, but is believed to begin by the formation initially of a relatively short chain soluble interpolymer having an approximate structure as follows, acrylamide being utilized for illustrative purposes:

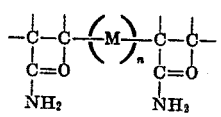

wherein M represents a unit of a monomer polymerizable with acrylamide, and $n$ represents a whole number greater than 1. For example, if styrene were utilized as the second monomer, M would represent the unit

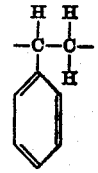

The short chain interpolymer then reacts with an aldehyde as represented by formaldehyde, to give the structure:

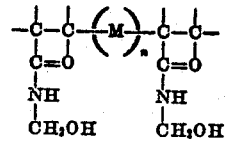

wherein M and $n$ have the significance set forth hereinabove.

In the event the formaldehyde is utilized in the form of a solution in butanol or other alkanol, etherification may take place so that at least some of the methylol groups in the above structure will be converted to groups of the structure

—CH$_2$O-Alkyl the alkyl group being derived from the alkanol utilized. The amount of etherification taking place depends in large measure upon the pH of the reaction medium, with acid conditions favoring etherification. The etherification of the acrylamide interpolymer is analogous to the conventional butylation of urea and melamine resins.

Among the monomers which may be polymerized with acrylamide are included methyl acrylate, ethyl acrylate, butyl acrylate, isobutyl acrylate, hexyl acrylate, octyl acrylate, styrene, vinyl toluene, maleate esters such as dibutyl maleate, acidic materials such as acrylic acid, methacrylic acid, maleic anhydride, vinyl ethers, vinyl ketones, vinyl pyridines, allyl acetoacetates, glycidyl acrylates, methacrylamide, dimethylbenzyl methacrylate, durenediol dimethacrylate, and the like. In general, it is preferred that the monomer utilized contain a single CH$_2$=C< group in terminal position, and an especially preferred group of monomers includes ethyl acrylate, butyl acrylate, methyl acrylate, styrene, vinyl toluene, acrylic acid, and monomethyl styrene.

It has been found that preferred acrylamide interpolymers are obtained when at least two monomeric compounds are interpolymerized with the acrylamide. In this manner it is possible to tailor the interpolymer to have any desired degree of hardness or flexibility. For example, one useful ternary interpolymer is prepared from acrylamide, ethyl acrylate and styrene. Also, a small amount of methyl methacrylate tends to improve the hardness of two component interpolymers where one of the monomers is of the type which forms soft homopolymers, and a small quantity of an acid monomer such as acrylic acid, methacrylic acid, crotonic acid, maleic acid, or fumaric acid has been found to be particularly useful as an internal catalyst in that it imparts to the coating composition desirable fast curing properties. In place of acrylamide, any other polymerizable amide, for example, methacrylamide or itaconate diamide may be utilized.

Interpolymers of acrylamide with one or more polymerizable monomers are most readily prepared by carrying out the polymerization in a solvent in which the acrylamide, a white, crystalline solid at room temperature, and the other monomer(s) are soluble, and at reflux temperatures. Butanol has proven to be a satisfactory solvent in most cases. Isopropyl alcohol, butyl Cellosolve, and mixtures of butanol or other lower alkanol with water can also be used advantageously as solvents. Some care must be exercised when water is present in the system as gummy precipitates may result, especially at the higher water levels. The presence of lower alcohols or water has been found to moderate the speed of reaction by lowering the reflux temperature. Butyl or ethyl acetate, or other ester solvents, and hydrocarbons such as xylene and the like may also be employed.

In carrying out the polymerization reaction a peroxygen type catalyst is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The diazo compounds, such as p-methoxyphenyl diazothio-(2-naphthyl) ether, may also be used as polymerization catalysts in the preparation of acrylamide interpolymers. Redox catalyst systems can also be employed.

The quantity of catalyst employed can be varied considerably; however, in most instances it is desirable to utilize from about 0.1 percent to 2.0 percent. If high viscosities are desired, a low initial level of catalyst, followed by the necessary additions to get 100 percent conversion, is preferably employed. For low viscosity interpolymers the bulk of the catalyst is added initially and later additions used only to secure desired conversions. Larger amounts of catalyst added initially give lower viscosities.

Since it is desirable that the interpolymers of acrylamide with other ethylenically unsaturated monomers be relatively low in molecular weight so that they can be dissolved at high solids and low viscosities, a chain modifying agent or chain terminator is ordinarily added to the polymerization mixture. The use of a lower alkanol such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodecyl mercaptan, octyl mercaptan, hexyl mercaptan, and the like are conventionally used for this purpose. However, other chain modifying agents or "short stopping" agents such as cyclopentadiene, allyl acetate, allyl carbamate, alpha-methyl styrene, alpha-methyl styrene dimers, and the like can be used to secure low molecular weights, as can unsaturated fatty acids or esters.

The polymerization is best carried out by admixing the acrylamide, or other polymerizable amide, and the other monomer or monomers, the catalyst and chain modifying agent, if any, in the solvent, and refluxing the resulting solution for a time sufficient to obtain the desired conversion. Ordinarily, the polymerization will be complete in about 1 to 16 hours. As indicated hereinabove, it may in some instances be desirable to add only a portion of the catalyst initially, the remainder being added in increments as the polymerization progresses. External cooling of the polymerization mixture or very accurate control of reflux conditions are important in carrying out the polymerization because of the very rapid reaction rate and because the reaction is highly exothermic. Some control of the heat of reaction is obtained by adding the acrylamide to the polymerization mixture incrementally. Good agitation is also desirable.

Another method for preparing acrylamide interpolymers involves utilization of "block" and "graft" techniques. Conventional polymerization procedures, such as that described in the foregoing paragraph, ordinarily result in a random distribution of the components in the interpolymers. By "block" or "graft" methods, the component can be introduced into the composition in regular sequence or order, each segment being of a certain length and periodicity. These products can be made such that the acrylamide portion is in fixed position in the chain, this approach involving the preparation of segments which react in groups or react in sites along a preformed backbone from which or to which other segments can be grown or attached. The properties of materials prepared by this relatively new technique are known to be quite different in many instances from interpolymers in which the components are randomly oriented. By the "block" or "graft" method, one can prepare, by choice, materials of different solubility, solvent and flame resistance, adhesion, water solubility, and, in fact, almost any desired property can be "tailored" into the interpolymer.

Useful resinous materials containing acrylamide are obtained by reacting the interpolymers prepared according to the method described above with an aldehyde. Formaldehyde, in solution in water (formalin) or in a lower alcohol such as butanol, or a formaldehyde yielding substance such as para-formaldehyde, trioxymethylene, or hexamethylenetetraamine, is greatly preferred. However, other aldehydes including acetaldehyde, butyraldehyde, furfural, and the like, preferably containing only atoms of carbon, hydrogen, and oxygen, can be used.

It is preferred that the aldehyde be reacted with an interpolymer containing from about 5 percent to about 45 percent by weight of acrylamide, the balance being the other ethylenically unsaturated monomer(s). It has been found that those interpolymers containing the higher levels of acrylamide with those monomers which ordinarily form hard homopolymers, give hard and flexible films, whereas interpolymers containing lower levels of acrylamide with those monomers which ordinarily form soft homopolymers tend to be considerably softer. If more than one ethylenically unsaturated monomer is polymerized with acrylamide, the proportions of such additional monomers utilized will depend upon the characteristics which such monomer or monomers will impart to the final interpolymer. For example, in some ternary interpolymer systems it may be desirable to utilize about 20 percent by weight of acrylamide, and 40 percent each of two additional monomers such as styrene and butadiene, or in some instances, such as when acrylic acid or some other ethylenically unsaturated acid is utilized as an internal catalyst, it is desirable that the interpolymer contain about 20 percent acrylamide, a total of about 72 percent to 79 percent of two additional ethylenically unsaturated monomers and about 1.0 percent to about 8.0 percent of the unsaturated acid. The amount of the monomers necessary in any interpolymerization reaction can readily be determined by simple experiment.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of formaldehyde for each amide group in the interpolymer, or as low as about 0.2 equivalent of formaldehyde for each amide group in the interpolymer.

The reaction is preferably carried out in the presence of a mild acid catalyst such as maleic anhydride. Other acid catalysts such as oxalic acid, hydrochloric acid, or sulfuric acid, may also be utilized, although there is some possibility of gelation occurring if the catalyst is too strongly acidic. Alkaline catalysts such as sodium hydroxide, potassium hydroxide, hexamethylenetetraamine, and other basic amines may also be utilized, and, in fact, there is evidence to indicate that the use of the basic catalysts tends to give faster curing resin films.

If desired, the catalyst may be dispensed with entirely, although it is difficult to obtain satisfactory reaction structure. These materials, which are ordinarily polyglycidyl ethers of bisphenol, or polyether derivatives of polyhydric phenols containing epoxide groups, are ordinarily formed by the reaction of bisphenols with epichlorohydrin, and range from viscous liquids to hard, brittle resins. A representative epoxy resin structure may be illustrated as follows:

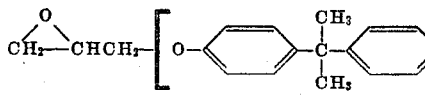 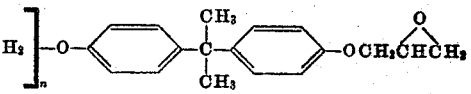

unless a catalyst is employed. The quantity of catalyst utilized may be varied widely; for example, as pointed out hereinabove, the more acidic the reaction medium, the greater the amount of etherification which will occur if an alcohol solution of the aldehyde is utilized. If the aldehyde is not used in the form of an alcoholic solution, it is preferred to utilize from about 0.2 percent to 1.0 percent by weight of catalyst, based upon the weight of the acrylamide interpolymer which is reacted with the aldehyde.

The reaction of the acrylamide interpolymer with the aldehyde can be carried out simply by adding the aldehyde and the catalyst (if one is utilized) to the polymerization mixture obtained by polymerizing acrylamide and one or more ethylenically unsaturated monomers and refluxing the resulting mixture for a period of from about 3 to 5 hours until a desired viscosity is obtained. The water of condensation can be removed by azetropic distillation as may a portion of the solvent if desired. In fact, when the aldehyde is utilized in the form of a solution in an alkanol such as butanol, it is desirable that approximately half of the butanol be distilled off at the end of the reaction period and replaced by another solvent such as xylol. It is preferred that the final resinous material have a solids content of about 20 percent to 70 percent.

Similar polymeric materials may also be obtained by first reacting the acrylamide with an aldehyde such as formaldehyde to obtain an alkylol acrylamide, for example, methylol acrylamide, and then polymerizing the methylol acrylamide with one or more of the ethylenically unsaturated monomeric materials disclosed hereinabove. The polymerization utilizing methylol acrylamide is carried out in substantially the same manner as when acrylamide is interpolymerized with one or more monomers.

Regardless of the method by which the resinous material is obtained, the products which are blended with epoxy resins in accordance with this invention will contain in the polymer chain recurrent

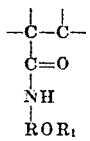

groups, wherein R is a lower aliphatic hydrocarbon radical, that is, the radical derived by removing oxygen from a lower aliphatic aldehyde; for example, if formaldehyde is utilized the radical R represents a methylene group ($-CH_2-$). When an alcoholic solution of the aldehyde, for example, a butanol solution of formaldehyde is employed, etherification may take place and at least a portion of the alcohol is reacted into the polymer chain so that at least some of the radicals $R_1$ will represent a lower alkyl radical such as butyl, or in other words, a mixture of hydrogen and butyl radicals. When the aldehyde is utilized alone, that is, not in an alcohol solution, the radical $R_1$, of course, will represent hydrogen. The free valences may be satisfied with either hydrogen or hydrocarbon, depending on the amide which is utilized.

The epoxide resin which is blended with an aldehyde modified acrylamide interpolymer in accordance with the present invention may vary considerably in chemical In the foregoing structure, $n$ is a number of a magnitude dependent upon the degree to which the etherification is carried. The most simple epoxy resin will be free of functional groups other than epoxide and hydroxyl groups, and will contain at least 4 carbon atoms as illustrated by 1,2-epoxy-3,4-epoxy butane. More complex epoxy resins, such as those which result from the reaction of two or more moles of a diepoxide with one mole of a dihydric phenol, or the reaction of three or more moles of a diepoxide with one mole of a trihydric phenol, and diepoxides or polyepoxides derived from polyhydric alcohols such as sorbitol, pentaerythritol, or polyallyl alcohol, may also be used. Among the many phenolic compounds utilized in the preparation of epoxy resins are included the following:

Bis(4-hydroxy-phenyl)2,2-propane
4,4'-dihydroxybenzophenone
Bis(4-hydroxy-phenyl)1,1-ethane
Bis(4-hydroxy-phenyl)1,1-isobutane
Bis(4-hydroxy-phenyl)2,2-butane
Bis(4-hydroxy-phenyl)2,2-propane
Bis(4-hydroxy-tertiary butyl phenyl)2,2-propane
Bis(2-hydroxy-naphthyl)methane
1,5-dihydroxy-naphthalene The epoxy component of the epoxy resins may be selected from compounds of the following group:

1-chloro-2,3-epoxy propane (epichlorohydrin)
1-chloro-2,3-epoxy butane
1-chloro-3,4-epoxy butane
2-chloro-3,4-epoxy butane
1-chloro-2-methyl-2,3-epoxy butane
1-bromo-2,3-epoxy pentane
2-chloromethyl-1,2-epoxy butane
1-bromo-4-methyl-3,4-epoxy pentane
1-bromo-4-ethyl-2,3-epoxy pentane
4-chloro-2-methyl-2,3-epoxy pentane
1-chloro-2,3-epoxy octane
1-chloro-2-methyl-2,3-epoxy octane
1-chloro-2,3-epoxy decane Of the epoxy compounds, epichlorohydrin is the most desirable because of its general commercial availability and relatively low cost. However, other epoxy compounds may be used, particularly where special properties are desired in the resin.

The epoxy resins are frequently characterized by molecular weight, and it has been found that those epoxy resins possessing a molecular weight above 200 and preferably about 700 to 1000 are most suitable for use in the compositions of this invention. However, epoxides having other molecular weights may also be utilized.

The quantity of epoxide resins which is blended with an aldehyde modified acrylamide interpolymer to form the resinous portion of the coating compositions of this invention may be varied considerably. For example, amounts as low as about 5 percent by weight give enhanced properties to the coating compositions, and amounts as high as 40 percent or more of the epoxide may be employed, although films prepared from compositions containing larger amounts of the epoxide resin tend to be slightly brittle. Preferably, the epoxide is utilized in an amount of about 10 percent to about 20 percent.

No special expedients are necessary in formulating the coating compositions of this invention. For example, they may be prepared simply by admixing a solution of the aldehyde modified acrylamide interpolymer with a solution of the epoxide resin. No heating is required as the components may be blended readily in the cold state. The solvents utilized are likewise not critical and any solvent or solvents which will dissolve the particular acrylamide interpolymer and the epoxide resin utilized may be employed. Since the acrylamide interpolymer is ordinarily prepared in a butanol solution, butanol is conveniently used as one of the solvents, although as pointed out hereinabove, it is desirable to replace about half of the butanol with another solvent such as xylol. The epoxy resin is preferably utilized in the form of a 60 percent solution in a mixture of 25 percent methyl isobutyl ketone and 75 percent xylol. Ordinarily, lowest viscosity is obtained with oxygenated solvents such as the ketones, and particularly methyl isobutyl ketone. Useful compositions within the scope of the invention can also be obtained by cooking the epoxy resin and the aldehyde modified amide resin together, and dissolving the resultant product in a suitable solvent system.

Pigments such at titanium dioxide, carbon black, and the like may be added to the coating compositions to form any desired color. Other ingredients normally found in coating compositions, such as germicides, fillers, driers, silicones, and the like may also be added.

When an internal catalyst such as acrylic acid, methacrylic acid, or the like is present in the interpolymer, no additional catalyst is needed to promote the cure of the films obtained from coating compositions disclosed herein. However, in the event the interpolymer does not contain an internal catalyst, it is desirable to add an acidic material shortly before the composition is to be utilized. Suitable catalysts for this purpose include citric acid, tartaric acid, phosphoric acid, as well as latent catalysts, that is, materials which decompose into acidic materials when heated. Suitable cures may also be obtained in the absence of any catalyst, although slightly higher temperatures and/or baking times may be necessary when a catalyst is not present.

The following examples illustrate in detail the preparation of the reesinous materials by the reaction of interpolymers of acrylamide with ethylenically unsaturated monomers, and an aldehyde, and the use of such materials in blends with epoxy resins. The examples are not intended to limit the invention, however, for there are, of course, numerous possible variations and modifications.

*Examples I to VI*

These examples illustrate the preparation of aldehyde modified acrylamide interpolymers which can be blended with epoxy resins to form the coating compositions of this invention. The polymerization in each example was carried out by mixing the polymerizable components with a chain transfer agent (except in Example VI where none was utilized) in a solvent such as butanol or xylene, and adding a polymerization catalyst, either initially or in increments throughout the polymerization reaction. The polymerization mixture was then refluxed (in a bomb when butadiene-1,3 was the monomer) for a period of time sufficient to obtain a conversion of substantially 100 percent. The polymerization charge, reflux time, interpolymer properties, formaldehyde condensation procedure, and the properties of the resinous condensation product are reported in the following table, wherein the letters have the following significance:

A—Benzoyl peroxide
B—Di-t-butyl peroxide
C—Cumene hydroperoxide
D—Alpha-methyl styrene dimers
E—Dodecyl mercaptan
F—Tertiary dodecyl mercaptan

|  | Example I | Example II | Example III | Example IV | Example V | Example VI |
|---|---|---|---|---|---|---|
|  | 15% acrylamide, (A) 25% methyl methacrylate, (B) 60% ethyl acrylate | 20% acrylamide, (A) 20% methyl methacrylate, (B) 60% ethyl acrylate | 15% acrylamide, (A) 25% styrene, (B) 60% ethyl acrylate | 20% acrylamide, (A) 40% styrene, (B) 40% butadiene | 20% acrylamide, (A) 40% styrene, (B) 40% butadiene | 20% acrylamide, (A) 80% vinyl toluene |
| Polymerization charge and procedure, Parts: |  |  |  |  |  |  |
| Acrylamide | 3 | 40 | 3 | 160 | 160 | 250 |
| Monomer A | 5 | 40 | 5 | 320 | 320 | 1,000 |
| Monomer B | 12 | 120 | 12 | 320 | 320 |  |
| Catalyst | 90.8C | 2A | 90.8C / 90.8A | 16.0B | 16.0B | 25.0A |
| Modifier | 90.8F | 2.0D | 90.8F | 8.0E | 8.0E |  |
| Solvent: |  |  |  |  |  |  |
| Butanol | 20.0 | 200 | 20.0 | 1,200 | 1,200 | 1,250 |
| Xylene |  |  |  | 500 | 500 |  |
| Reflux time _____ hours | 4 | 1 | 6 | ¹ 16 | ¹ 16 | 10 |
| Polymer properties: |  |  |  |  |  |  |
| Percent solids | 52.5 | 51.6 | 51.5 | 25.1 | 25.1 | 49.1 |
| Viscosity (Gardner) | Z3 | Z5–Z6 | Z |  |  |  |
| Formaldehyde condensate, Parts: |  |  |  |  |  |  |
| Butanol solution of formaldehyde | 6.34 | 84.6 | 6.34 | 339 | 339 | ² 75/351 |
| Maleic anhydride | 36.3 | 1.0 | 36.3 | 4.5 | 4.5 | 1.0 |
| Reflux time _____ hours | 3 | 3½ | 3 | 4 | 4 | 16 |
| Final product: |  |  |  |  |  |  |
| Percent solids | 50.1 | 48.95 | 50.6 | 49.4 | 49.4 | 41.3 |
| Viscosity (Gardner) | Y | Y | U–V | Z | Z | X–Y |
| Color (Gardner) | 3–4 | <1 | 3–4 | 3–4 | 3–4 | 1–2 |

¹ Bomb.  ² Parts resin.

*Example VII*

An interpolymer was prepared from a mixture of the following materials:

|  | Parts by weight |
|---|---|
| Styrene | 40 |
| Ethyl acrylate | 45 |
| Acrylamide | 15 |
| Cumene hydroperoxide | 1 |
| Tertiary dodecyl mercaptan | 1 |

The above components were refluxed in butanol for about 6 hours. The resulting product was then admixed with 2 moles of formaldehyde in the form of a 40 percent solution in butanol and the mixture refluxed for an additional 3 hours. One half of the butanol was then removed by distillation and replaced by an equal volume of xylene. The resulting resinous product had the following properties:

Solids (percent) _____ 48–52.
Weight per gallon _____ 8.0±01.
Viscosity (Gardner-Holdt) _____ U to W.
Color (Gardner 1933) _____ 5 (maximum).
Mineral spirits tolerance (cc. of naphtha per 100 grams resin) _____ 75 (minimum).

The resin thus prepared for formulated into a white appliance enamel as follows:

| | Parts by weight |
|---|---|
| Rutile titanium dioxide | 207 |
| Formaldehyde modified acrylamide interpolymer solution | 647 |
| Epoxy resin solution (60 percent solution in 15 percent methyl isobutyl ketone and 25 percent xylol; molecular weight of resin about 900) | 53 |
| Pine oil | 10.5 |
| Cellosolve acetate | 20 |
| Silicone solution (Linde X12) | 2 |
| Phosphoric acid solution (8½ percent solution in butanol) | 18 |

In formulating the enamel, the titanium dioxide was admixed with 147 parts of the formaldehyde modified acrylamide interpolymer and the mixture ground on a Kent 3 roll mill. The remaining interpolymer and the other remaining components, with the exception of the phosphoric acid solution, were added and the mixture blended to a viscosity of 7 minutes, 14 seconds in a Ford #4 cup. The phosphoric acid solution (curing catalyst) was then added and the formulation reduced to a spray viscosity of 28 seconds in a #4 Ford cup by the addition of xylol in an 8:5 ratio. The resulting coating composition before spray reduction had a total solids content of 58.4 percent.

The appliance enamel thus prepared was then sprayed onto both primed and unprimed steel panels to a film thickness of 1.3 mils and cured for 30 minutes at 300° F. The films had the following properties, the ratings being based on a comparison with a standard alkyd base appliance enamel.

| | |
|---|---|
| Gloss (Gardner 60° gloss meter) | 90+. |
| Pencil hardness | 2H. |
| Mar resistance | Excellent. |
| Adhesion to Bonderite steel | Excellent. |
| Recoat adhesion | Excellent. |
| Impact resistance | 6 inch/pounds. |
| Immersion in vegetable oil 100 hours at 100° F. (pencil hardness) | H. |
| 250 hour salt spray (unprimed) | Excellent. |
| 250 hour salt spray (primed) | Excellent. |
| 1000 hour humidity (unprimed) | No change. |
| 1000 hour humidity (primed) | No change. |
| 150 hour detergent (Surf) resistance at 140° F. (unprimed) | Excellent. |
| 750 hour detergent (Surf) resistance at 140° F. (primed) | Excellent. |
| 100 hour mustard stain resistance | No stain. |
| 100 hour lipstick stain resistance | No stain. |
| 100 hour ink stain resistance | No stain. |

In addition to the outstanding properties set forth above, which demonstrate the definite superiority over standard appliance finishes, the films had extremely good over-bake color retention, even when baked for as long as 60 minutes at 350° F. or 400° F.

*Example VIII*

Eighty-five parts of vinyl toluene, 15 parts of acrylamide, 1 part of cumene hydroperoxide and 1 part of tertiary dodecyl mercaptan were refluxed for 2 hours and 0.5 part of additional cumene hydroperoxide was added. Refluxing was continued for a further period of 2 hours. The product was then admixed with a solution comprising 2 moles of formaldehyde (40 percent solution in butanol), and ⅓ part of maleic anhydride was added. The resulting mixture was then refluxed for 3 hours after which the butyl alcohol was distilled to provide a product having the following properties:

| | |
|---|---|
| Solids (percent) | 48–52. |
| Weight per gallon (pounds) | 7.9. |
| Viscosity (Gardner-Holdt) | X to Z. |
| Color | 8 (maximum). |
| Mineral spirits tolerance | 400 (minimum). |

The above acrylamide interpolymer was formulated into a coating composition having the following components in the quantities set forth below:

| Components: | Parts by weight |
|---|---|
| Rutile titanium dioxide | 204 |
| Formaldehyde modified acrylamide interpolymer of this example | 641 |
| Epoxy resin solution (60 percent in 75 percent methyl isobutyl ketone and 25 percent xylol; molecular weight of resin about 900) | 52.5 |
| Pine oil | 10.5 |
| Cellosolve acetate | 20 |
| Silicone solution (Line X12) | 2 |

The formulation was prepared as in Example VII. 17.5 parts of an 8½ percent solution of phosphoric acid was added to the composition which at this point had a viscosity of 10 minutes, 30 seconds in a #4 Ford cup. The formulation was then reduced in a ratio of 8:5 with xylol to give a spray viscosity of 28 seconds in a #4 Ford cup. The composition was then sprayed on both primed and unprimed steel panels to a film thickness of 1.5 mils and the films were cured for 30 minutes at 300° F. The films had the following properties, the ratings again being based on a comparison with standard commercial alkyd base appliance enamels.

| | |
|---|---|
| Gloss | 90+. |
| Pencil hardness | 3H. |
| Mar resistance | Excellent. |
| Adhesion to Bonderite steel | Satisfactory. |
| Recoat adhesion | Excellent. |
| Impact resistance | Less than 3 inch/pounds. |
| Immersion in vegetable oil 100 hours at 100° F. (pencil hardness) | 2H. |
| 250 hour salt spray (unprimed) | Excellent. |
| 250 hour salt spray (primed) | Excellent. |
| 1000 hour humidity (unprimed) | No change. |
| 1000 hour humidity (primed) | No change. |
| 150 hour detergent (Surf) resistance at 140° F. (unprimed) | Excellent. |
| 750 hour detergent (Surf) resistance at 140° F. (primed) | Excellent. |
| 100 hour mustard stain resistance | No stain. |
| 100 hour lipstick stain resistance | No stain. |
| 100 hour ink stain resistance | No stain. |

*Examples IX and X*

The formaldehyde modified acrylamide interpolymers of Examples I and III were formulated into appliance enamels substantially according to the formulation of the preceding examples. In each instance, films of the resulting enamels were easily applied to give smooth surfaces of high opacity, had good initial gloss, gloss retention and gloss clarity, excellent grease and stain resistance, moisture and chemical resistance, and adhered well to metallic surfaces.

*Example XI*

This example illustrates the use of an unsaturated acid in the acrylamide interpolymerization to provide an internal catalyst which accelerates the cure of the coating composition. The interpolymer was prepared from the following components in the amounts set forth:

| | Parts by weight |
|---|---|
| Styrene | 39 |
| Ethyl acrylate | 44 |
| Acrylamide | 15 |
| Acrylic acid | 2 |
| Cumene hydroperoxide | 1 |
| Tertiary dodecyl mercaptan | 1 |

The above components were admixed and refluxed for 2 hours after which an additional 0.5 part of cumene hydroperoxide was added and reflux was continued for a further period of 2 hours. A solution comprising 2 moles of formaldehyde (40 percent concentration in butanol) was added together with about 0.33 part of maleic anhydride catalyst. The resulting mixture was refluxed for 3 hours, after which ½ of the butyl alcohol was removed by distillation and replaced by an equal amount of xylene.

The formaldehyde modified interpolymer prepared in this manner was formulated into an appliance enamel according to the method of Example VII, except that it was not necessary to add the phosphoric acid catalyst inasmuch as the acrylic acid in the acrylamide interpolymer functions as an internal catalyst. The following are the properties of films obtained from the composition, as compared to a standard alkyd base appliance enamel:

| | |
|---|---|
| Cure | 20–350° F. |
| Gloss | 90+. |
| Pencil hardness | 3H. |
| Mar resistance | Excellent. |
| Adhesion to Bonderite treated steel | Excellent. |
| Impact resistance | 18–21 inch/pounds. |
| Immersion in vegetable oil 100 hours at 100° F. (pencil hardness) | 2H. |
| 250 hours salt spray exposure (unprimed) | Excellent. |
| 250 hours salt spray exposure (primed) | Excellent. |
| 100 hours detergent immersion (unprimed) | Excellent. |
| 500 hours detergent immersion (primed) | Excellent. |
| 100 hours salt detergent immersion (unprimed) | Good. |
| 500 hours salt detergent immersion (primed) | Excellent. |
| 100 hours mustard stain resistance | No Stain. |
| 100 hours lipstick stain resistance | No Stain. |
| 100 hours ink stain resistance | No Stain. |

*Examples XII and XIII*

An interpolymer containing 60 percent ethyl acrylate, 25 percent styrene, and 15 percent acrylamide, was condensed with formaldehyde. The resulting interpolymer was then blended with epoxy resins of varying molecular weight, the interpolymer comprising 75 percent by weight and the epoxide resin 25 percent by weight of the total resin solids. Baking temperatures and film properties are set forth below:

*Example XIV*

A formaldehyde modified acrylamide interpolymer was prepared according to the method of Examples I to VI inclusive utilizing 25 percent styrene, 60 percent ethyl acrylate and 15 percent acrylamide. The resin had the following properties:

| | |
|---|---|
| Solids (percent) | 48–52. |
| Weight per gallon | 7.9±0.1. |
| Viscosity (Gardner-Holdt) | W to Y. |
| Color (Gardner 1933) | 6 (maximum). |

The resin thus obtained was formulated into a white metallithographic enamel according to the following formulation:

| Component: | Parts by weight |
|---|---|
| Rutile titanium dioxide | 434 |
| Formaldehyde modified acrylamide interpolymer | 637 |
| Epoxy resin solution (60 percent in 75 percent methyl isobutyl ketone and 25 percent xylol). | |
| Molecular weight of resin | about 900 |

In preparing the enamel 280 parts of the acrylamide interpolymer and the titanium dioxide pigment were thoroughly mixed and placed on a Kent 3 roll mill. An additional 357 parts of the acrylamide interpolymer and the epoxy resin solution were then added and the mixture blended. The resulting composition was reduced with isophorone and cyclohexanone to a viscosity of 55 seconds in a #4 Ford cup. In this example the solvents were chosen to give a composition satisfactory for roll coating. 1.6 parts of phosphoric acid was then added and the enamel roll coated onto quarter pound tin plate, black iron and cold rolled steel, and baked for 30 minutes at 300° F. The hardness, toughness, mar-resistance and adhesion of the films were outstanding. The films also had excellent overbake, color and gloss retention and could be fabricated into cap blanks or can ends showing no failure in 5 minute copper sulfate immersion. After fabrication into screw top caps, the films were dry-heat processed with excellent results.

Obviously, a great many other aldehyde modified acrylamide interpolymers may be utilized in place of those specified in the examples. Similarly, other epoxide resins selected from those disclosed hereinabove may be substituted for the epoxy resins of the examples. Modifica-

| Epoxy resin epoxide equivalent | 30 minute cure, temperature | Sward hardness | Impact resistance (inch-pounds) | Solvent | Film appearance | Alkali resistance, hours |
|---|---|---|---|---|---|---|
| 190–210 | 350° F. | 10 | 44 | Butanol-methyl ethyl ketone | Clear | 100 |
| 190–210 | 400° F. | 32 | 48 | do | do | 100 |
| 190–210 | 350° F.+C* | 22 | 48 | Methyl ethyl ketone | do | 40 |
| 300–375 | 350° F. | 28 | | Butanol-methyl ethyl ketone | do | 100 |
| 300–375 | 400° F. | 44 | 48 | do | Clear–slightly yellow | 100 |
| 300–375 | 350° F.+C* | 26 | 48 | Methyl ethyl ketone | Clear | 100 |
| 450–525 | 300° F. | 38 | | Butanol-Cellosolve A-toluene | do | 100 |
| 450–525 | 350° F. | 46 | | do | do | 100 |
| 450–525 | 400° F. | 46 | 30 | do | Clear–slightly yellow | 100 |
| 450–525 | 300° F.+C* | 46 | 96 | Toluene | Clear | 100 |
| 870–1,025 | 300° F. | 44 | | Butanol-Cellosolve A-toluene | do | 100 |
| 870–1,025 | 350° F. | 56 | | do | do | 100 |
| 870–1,025 | 400° F. | 48 | 96 | do | Clear–slightly yellow | 100 |
| 870–1,025 | 300° F.+C* | 36 | 96 | Toluene | Clear | 100 |

C*=0.5% $H_3PO_4$ based on resin total solids.

In the specific examples, emphasis has been placed upon the preparation of appliance type enamels. While the compositions of this invention are particularly useful in this field, they are also useful as coatings for food containers, as thin coatings for aluminum foils, plastics or wall boards, as well as for many other coating purposes.

The following example illustrates the use of the products of this invention in heat resistant metallithographic finishes.

tions in the coating compositions may also be made; for example, pigments other than titanium dioxide may be utilized, as may different solvent systems. It is also possible to include in the coating compositions of this invention other resinous materials such as vinyl resins, alkyd resins, amine resins, or the like. Such resins are preferably utilized in minor amounts, although larger quantities may also be employed.

Thus, while specific examples of the invention have

We claim:

1. A heat hardenable resinous composition comprising a polyglycidyl ether of a polyhydric compound, and an interpolymer of an acrylamide with at least one other monomer having a $CH_2=C<$ group, said interpolymer being characterized by having amido hydrogen atoms replaced by the structure $$-ROR_1$$

wherein R is a saturated lower aliphatic hydrocarbon radical, and $R_1$ is a member of the class consisting of hydrogen and lower alkyl radicals.

2. An article having a metallic surface having as a coating thereon a heat hardened film of the resinous composition of claim 1.

3. The heat hardenable resinous composition of claim 1 wherein the polyglycidyl ether is a polyether derivative of a polyhydric phenol containing epoxy groups and being free from functional groups other than epoxy and hydroxyl groups.

4. The heat hardenable resinous composition of claim 3 wherein the polyglycidyl ether is a polyglycidyl ether of a diphenol, said polyepoxide having a molecular weight of about 200 to 1000, and wherein R is methylene, and $R_1$ is hydrogen.

5. A heat hardenable resinous composition comprising a polyglycidyl ether of a phenolic compound, and a monoaldehyde-substituted interpolymer of an acrylamide with at least one other monomer having a $CH_2=C<$ group, said monoaldehyde containing only atoms of carbon, hydrogen, and oxygen.

6. An article having a metallic surface having as a coating thereon a heat hardened film of the resinous composition of claim 5.

7. A heat hardenable resinous composition comprising a polyepoxide which is a polyether derivative of a polyhydric phenol, containing epoxy groups and being free from functional groups other than epoxy and hydroxyl groups, and an interpolymer of acrylamide with at least one other monomer having a single $CH_2=C<$ group, said interpolymer having been reacted with formaldehyde in an amount of at least about 0.2 equivalent for each amide group of said acrylamide interpolymer.

8. The resinous composition of claim 7 wherein the interpolymer is an interpolymer of styrene, ethyl acrylate and acrylamide.

9. The resinous composition of claim 7 wherein the interpolymer is a copolymer of styrene and acrylamide.

10. The resinous composition of claim 7 wherein the interpolymer is an interpolymer of styrene, ethyl acrylate, acrylamide, and an unsaturated carboxylic acid.

11. A heat hardenable resinous composition comprising a polyglycidyl ether of a polyhydric compound, and an interpolymer of acrylamide with at least one other monomer having a $CH_2=C<$ group, said interpolymer being characterized by having amido hydrogen atoms replaced by the structure $$-ROR_1$$

wherein R is a saturated lower aliphatic hydrocarbon radical, and $R_1$ is a member of the class consisting of hydrogen and lower alkyl radicals.

References Cited in the file of this patent

UNITED STATES PATENTS

| | | |
|---|---|---|
| 2,173,005 | Strain | Sept. 12, 1939 |
| 2,521,911 | Greenlee | Sept. 12, 1950 |
| 2,680,110 | Loughran et al. | June 1, 1954 |
| 2,707,708 | Wittcoff | May 3, 1955 |